Feb. 21, 1961

W. R. DRESSER 2,972,281

PANORAMIC PROJECTOR

Filed March 16, 1956

INVENTOR.
Willis Robert Dresser
BY Emery, Whittemore,
Dowdell & Dix.
ATTORNEYS

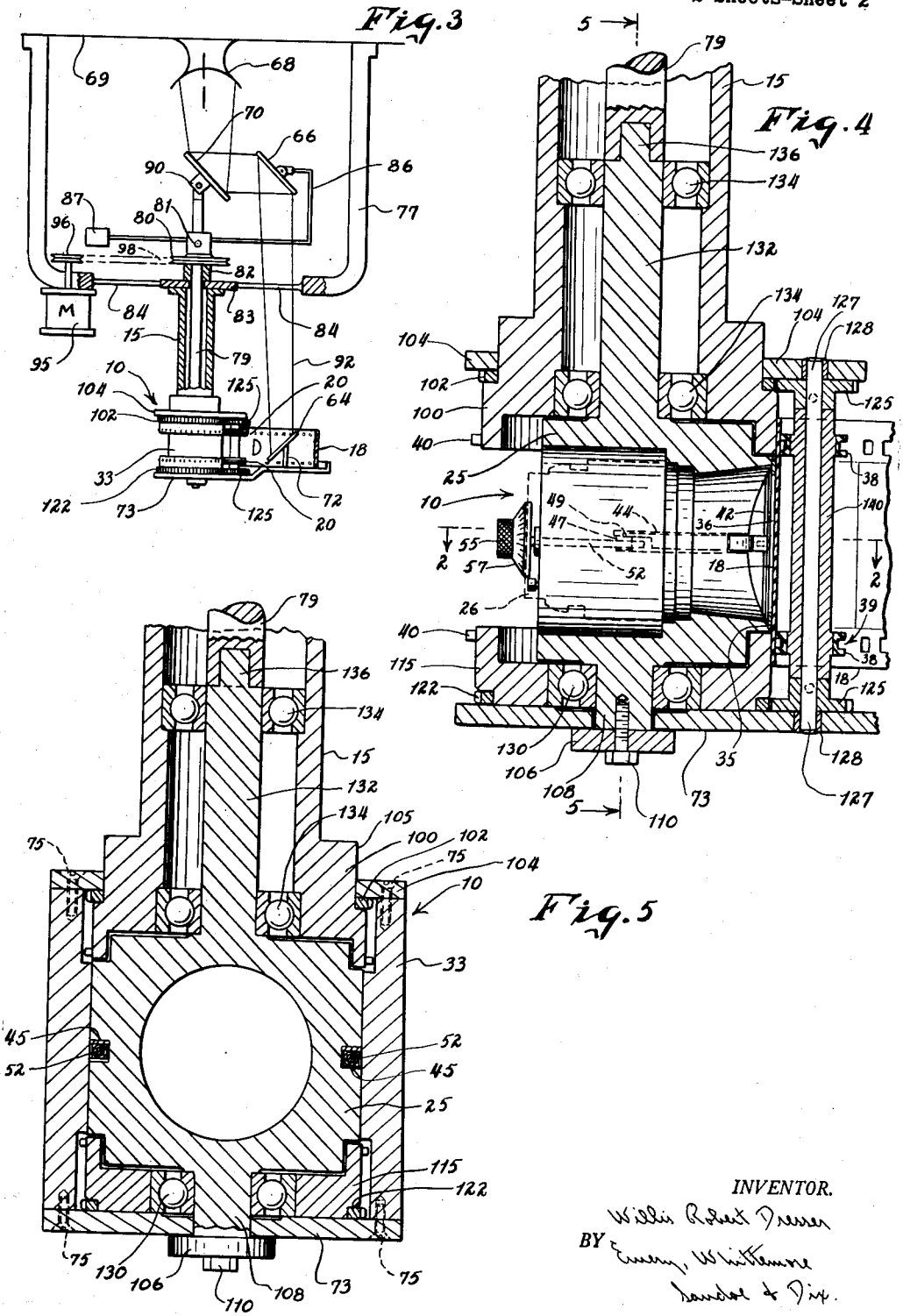

United States Patent Office 2,972,281
Patented Feb. 21, 1961

2,972,281

PANORAMIC PROJECTOR

Willis Robert Dresser, Long Hill, Conn., assignor, by mesne assignments, to The Prudential Insurance Company of America, a corporation of New Jersey Filed Mar. 16, 1956, Ser. No. 572,024

6 Claims. (Cl. 88—16.8)

This invention relates to projectors, and more especially to projectors for use with screens having fields wider than the field produced by the projector lens. The invention relates to a projector which moves in a manner to extend the field of the image, particularly in a horizontal direction.

It is an object of the invention to provide an improved projector for producing images on screens of great longitudinal extent.

It is another object of the invention to provide a projector which will produce an image on a screen extending all the way around the room or other enclosure in which the projector is operated. In place of a screen of 360° extent, screens of any desired lesser extent can be employed.

Another object of the invention is to provide a projector which can be used to produce a decorative, or educational image, or an advertising display around the upper part of the wall of a hall or showroom.

In the preferred embodiment of the invention, the screen is cylindrical and the projector is located adjacent to, or at, the center of the cylinder and the projector is suspended from over head so as not to be an obstruction in the hall or showroom where the screen is located. It is not essential that the entire extent of the screen be cylindrical where the screen is at a substantial distance from the projector so that any changes in distance from the projector to the screen are a small percentage of the total distance and not sufficient to impair the focus of the image.

It is another object of the invention to provide a projector which moves in a direction to extend its field of coverage, and which moves the film, or other transparency, in a direction to compensate the movement of the projector. This compensation may be complete so that the image projected on the screen does not move when the projector moves, or the compensation may be only partial where it is desirable to have the image on the screen move horizontally with a steady progressive movement during the time that it is displayed. This latter condition may be particularly desirable in showrooms where the images represent different models of products offered for sale.

Where a progressive movement of the image is desired, however, such movement can be at any desired rate regardless of the rate of movement of the projector by merely changing the transparency movement which compensates the projector movement.

Another object of the invention is to provide a projector of the character indicated, which will be referred to hererin as a "panoramic projector," which is of simple and efficient construction, and economical to manufacture.

Other objects, features and advantages of the invention will appear or be pointed out as the description proceeds.

In the drawing, forming a part hereof, in which like reference characters indicate corresponding parts in all the views;

Figure 3 is an enlarged, diagrammatic, vertical elevation, partly broken away and in section, of the projector shown in Figure 1 together with its supporting and operating mechanism;

Figure 4 is a reduced scale, vertical, sectional view taken on the line 4—4 of Figure 2; and Figure 5 is a vertical sectional view taken on the line 5—5 of Figure 4, with no lens shown in the lens mount.

Figure 1:
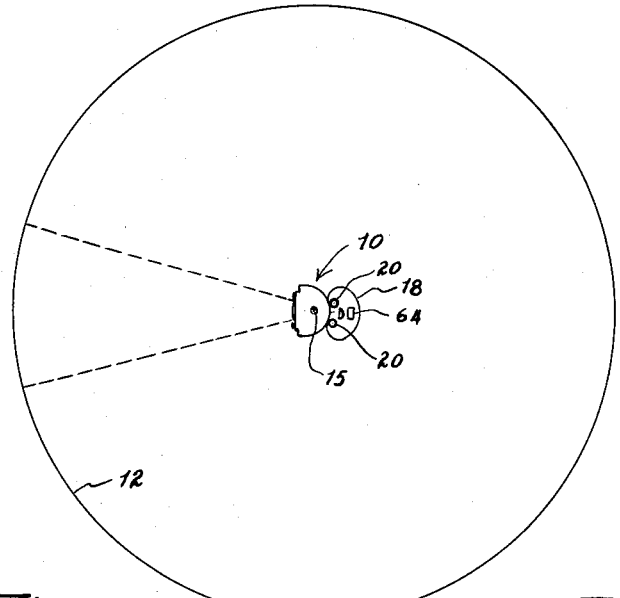
Figure 1 is a diagrammatic view showing the panoramic projector of this invention located at the center of a screen which extends for the full 360° of angular extent around the projector.

Figure 1 shows a panoramic projector 10 located adjacent to the center of a screen 12. This screen is cylindrical and may be the wall of a room in which the projector 10 is located. One purpose, for which the projector is especially intended, is to project an image around the full extent of a room on a screen which is located on the upper part of the wall so that there are no shadows cast on the screen by persons moving about in the room.

The diameter of the room or screen 12 is small as compared to the size of the projector 10 in Figure 1 for purposes of clearer illustration, but it will be understood that the projector 10 can be used in very large rooms and with any desired height of screen by properly designing the optical characteristics of the lens so as to produce an image of the desired height at the intended distance of the screen from the projector.

The projector 10 rotates about the longitudinal axis of the screen 12 on a support 15 which preferably extends downwardly from the ceiling; and the projector 10 is located at a height above the heads of the people in the room. A loop of film 18 is carried by the projector 10 and this loop of film may be of a length to produce an image extending around the entire circumference of the screen 12.

By having the loop of film 18 move lengthwise of the film as it is wrapped around a fixed part of the supporting structure, in a manner which will be explained in connection with a detailed description of the other views, the projector can be made always to project the same portion of the film loop 18 on the same area of the screen 12. This produces a circumferential image on the screen which remains stationary. The projector 10 is rotated at a rate which is correlated with persistence of vision so that the entire screen 12 appears to be illuminated at all times.

If a shorter loop 18 is used, the image on the screen may be repeated along different angular portions of the screen. For example, if the loop is long enough to make an image around only one half of the screen 12, then the same image will be repeated around the other half, but both images will be shown on the screen simultaneously to observers, so long as the projector 10 rotates at a fast enough rate to obtain continuous illumination of the screen through the phenomena of persistence of vision.

Figure 2:
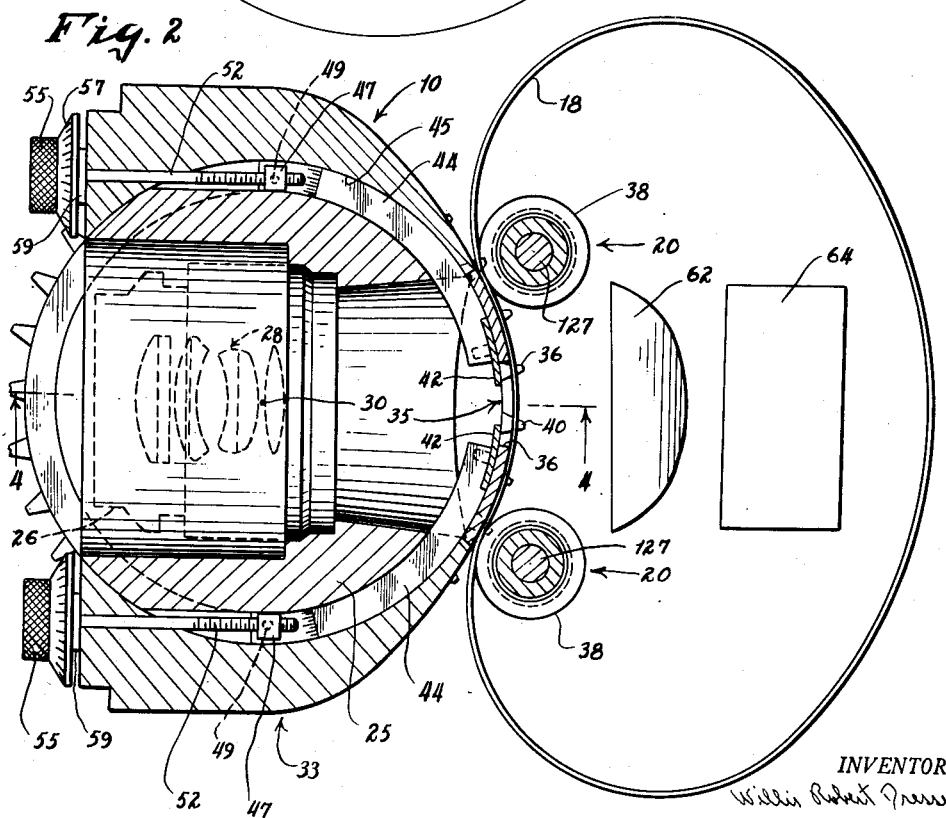
Figure 2 is a greatly enlarged, horizontal sectional view of the projector shown in Figure 1, the section being taken along the line 2—2 of Figure 4.

The projector 10 is shown on a larger scale in Figure 2. An inner frame 25, which is substantially cylindrical about a vertical axis, has a horizontal opening therein, and there is a lens mount 26 in this center opening. The lens in the mount is ordinarily a compound lens and is indicated generally in dotted lines with the reference character 28. The second principal point of the lens 28 is indicated by the reference character 30 and this point 30 is preferably on or closely adjacent to the axis of rotation of the projector 10.

The projector has an outer frame 33 which surrounds the inner frame 25 and both of these frames 25 and 33 rotate as a unit.

There is a gate 35 having confronting vertical edges 36 on opposite sides of its opening through which the light passes. The film loop 18 is held against the back surfaces of the plates 36 by friction faces 38 of rollers 39. These rollers 39 hold the film on sprocket teeth 40 which extend from a fixed portion of the camera, as will be described more fully in connection with Figure 4. The rollers 39 have circumferential grooves to provide clearance for the sprocket teeth which extend through the film immediately in front of the rollers.

There are mask plates 42 extending for the full height of the gate 35, and these mask plates 42 are movable toward and from one another to form an aperture of controlled width at the gate 35. Each of the mask plates 42 is connected to a slide 44 shaped to move along arcuate guide bearings 45 formed by confronting faces of the inner and outer frames 25 and 33. There are blocks 47 extending upwardly from each of the slides 44 near the forward ends of the slides. Each of these blocks 47 is preferably connected with the slide 44 by a stud 49 which permits rotation of the block 47 with respect to the slide 44.

There is a threaded opening through each of the blocks 47 so that the blocks operate as nuts on threaded lead screw 52 extending through the front wall of the outer frame 33. A knob 55 is attached to the forward end of each of the lead screws 52, and these knobs 55 are preferably made with skirts 57 having angularly spaced graduations thereon for indicating the angular positions of the respective knobs 55 and for conveniently measuring the extent of any adjustment of the mask plates 42 by the knobs 55.

There are thrust collars 59 attached to the front walls of the outer frame 33 and extending into annular grooves in the mount 55 for preventing longitudinal movement of the knobs 55 and the shaft 52 to which the knobs are connected. Such thrust bearings are conventional with lead screws and no illustration of this construction is necessary for a complete understanding of the invention. It will be apparent that rotation of either shaft 52 causes the associated blocks 47 to move along the arcuate guide bearings 45 to shift its mask plate 42 toward or from the other mask plate. The openings in the frame 33, through which the shafts 52 extend, are large enough to permit some obliquity of the shafts 52 as the blocks 47 move along the arcuate paths to which they are confined.

Light is projected through the portion of the film strip 18 at the gate 35 from a condenser 62 to which the light beam comes from a reflector 64. The location of this reflector 64 with respect to a source of light, and other reflectors( is best shown in Figure 3.

Figure 3 shows the reflector 64, located within the film loop 18 and below an upper reflector 66. The source of light for the projector 10 is an arc light 68 attached to a primary fixed support, such as a ceiling 69. The arc light 68 is located in line with the axis of rotation of the projector 10. The light beam from the arc light 68 is first reflected by a reflector 70 which projects the beam over to the reflector 66 located above the third reflector which turns the light beam into line with the optical axis of the projector lens.

The reflector 64 is carried by a support 72 which is an extension of a bottom plate 73 attached to the outer frame 33 of the projector 10 by screws 75, as shown in Figure 5. Thus the plate 73 rotates as a unit with the projector.

Referring again to Figure 3, the projector 10 is supported by the support 15 which is preferably tubular and attached to a fixed over head frame 77 connected to the ceiling 69. The support 15 is rigidly connected to the frame 77 and does not rotate. The bearings on which the projector 10 is rotatable will be illustrated and described in connection with Figures 4 and 5, and for the present it is sufficient to understand that the projector 10 is rotatably supported by the fixed tubular support 15 and is driven by a shaft 79 extending downwardly through the support 15.

A driving pulley 80 is secured to the upper part of the shaft 79 by a set screw 81, and the shaft 79 is held against longitudinal displacement by a thrust collar 82 located between the pulley 80 and a hub 83 of the fixed frame 77. This hub 83 is connected to the other part of the fixed frame 7 by spokes 84.

The reflector 66 is supported above the reflector 64 by a bracket 86 connected to the hub of the pulley 80. This bracket is preferably provided with a counter weight 87 for bringing the center of gravity of the bracket 86 and its assembled parts substantially into line with the axis of rotation of shaft 79 so as to avoid vibration and eccentric loads on the bearings when the projector is rotating.

The light beam 92 from the reflector 66 passes between the spokes 84 in its travel downwardly to the last reflector 64 and these spokes are in the light beam at certain times during the rotation of the reflectors with the projector. The shadows of the spokes are not noticeable, however, because the spokes 84 are narrow and the beam passes each spoke rapidly.

The projector 10 is rotated by a motor 95 carried by the fixed frame 77. This motor 95 has a pulley 96 secured to armature shaft; and rotation of the pulley 96 is transmitted to the pulley 80 by a V belt 98. In the construction illustrated, the pulley 96 is of smaller diameter than the pulley 80 so that the shaft 79 is driven at a speed slower than the motor speed. These pulleys 80 and 96, and the belt 98 may be considered representative of motion transmitting means between the motor and the projector for rotating the projected at any motor-projector speed ratio for which the apparatus is designed.

The tubular support 15 has a lower end 100 (Figure 4) of enlarged diameter. A shoulder on this lower end 100 supports a spur gear 102 rigidly connected to the support 15 and concentric therewith. Above the gear 102, there is a top plate 104 which rotates on a cylindrical bearing surface 105 on the tubular support 15. This top plate 104 is attached to the outer frame 33 by screws 75 (Figure 5) and is a part of the rotating projector 10. The sprocket teeth 40 extend from this lower end 100 and are integral with the structure of the lower end 100.

The top plate 104, outer frame 33, and bottom plate 73 are supported from the inner frame 25 of the projector by a washer 106 located under the bottom plate 73 and attached to a stud 108 extending downwardly from the inner frame 25 along the axis of rotation of the projector. A screw 110 connects the washer 106 to the lower end of the stud 108.

A lower stationary element 115 is located between the inner frame 25 and the bottom plate 73. This lower stationary element 115 carries a spur gear 122 corresponding to the spur gear 102 on the lower end 100 of the tubular support 15. The gears 102 and 122 are the same size and have the same number of teeth, and they mesh with pinion gears 125 near the upper and lower ends of jack shafts 127. Each of the jack shafts 127 rotates in bearings 128. The upper bearing 128 is carried by the top plate 104; and the lower bearing 128 is carried by the bottom plate 73. The pinions 125 are fastened to the jack shaft 127 by pins, or in any other manner which makes the pinions 125 rotate as a unit with the jack shaft 127.

Rotation of the projector 10 causes the jack shaft 127 to travel with an orbital movement about the axis of rotation; and this causes the upper pinion 125 to roll around the gear 102 which is attached to the fixed lower end 100 of the support 15. This rolling of the upper pinion 125 turns the jack shaft 127 which transmits motion to the lower pinion 125. The lower pinion 125 rotates at the same speed as the upper pinion and the jack shaft 127. The relative rotation imparted to the lower gear 122, by the lower pinion gear 125, causes the gear 122, and the element 115 to which the gear 122 is connected, to remain stationary in space.

There is a ball bearing assembly 130 located between the stud 108 and the bottom element 115. This ball bearing permits relative rotation of the stud 108 with respect to the element 115.

Another stud 132 extends upwardly from the inner frame 25 of the projector and into the tubular support 15. There are ball bearings 134 in the support 15, including its bottom bearing element 100 and the stud 132 rotates freely in these ball bearings 134. At its upper end, the stud 132 is connected to the shaft 79 by a tongue and slot connection 136. This connection 136 is merely representative of driving connections between the shaft 79 and the stud 132, and the stud 132 is a connection between the shaft 79 and the projector 10.

A sleeve 140 is located on each of the jack shafts 127 between the upper and lower pinions 125. The rollers 39 are connected to this sleeve 140, and in the construction shown are integral with this sleeve. The jack shaft 127 is connected to the sleeve 140 so that the rollers 39 rotate at the same speed as the jack shaft. The faces of the rollers 39 hold the film loop 18 against the stationary surface of the lower end 100 of the support 15. Thus the film, maintained in proper position by the sprocket teeth 40, is wrapped around the stationary surface of the lower end portion 100 as the rollers 39 travel with orbital movement, as previously explained.

The preferred construction of this invention has been illustrated and described, but changes and modifications can be made, and some features can be used in different combinations without departing from the invention as defined in the claims.

What is claimed is:

1. A panoramic projector assembly including a lens mount with bearings on which the lens mount is rotatable about an axis that passes through the second principal point of a lens carried by said mount, stationary cylindrical guiding means against which the opposite edge portions of a length of film are held during projection, a continuous loop of film behind the lens mount, means for supporting said loop of film with the top and bottom edge portions of one side of the loop of film in contact with said guiding means, the means for supporting said loop including two rollers substantially tangent to the stationary cylindrical guiding means and at angularly spaced locations around said stationary cylindrical, guiding means and holding the film against said guiding means, bearings from which the rollers are supported, said bearings being connected with the lens mount and rotatable as a unit therewith to move the rollers with orbital movement around the stationary cylindrical guiding means to wrap the loop of film progressively around said stationary cylindrical guiding means, a gate carried by the lens mount behind the lens and in line with the lens, and at an angular location between the rollers, the film loop passing through points of flexure and reversing its direction of curvature at said rollers whereby the loop beyond the rollers is behind the rollers, and a light supply element behind the gate and connected with the lens mount for orbital movement about the axis of rotation of the lens mount.

2. The panoramic projector assembly described in claim 1 and in which there are sprocket teeth on the stationary cylindrical supporting means in position to engage in sprocket openings in the film, and the rollers hold the film on the sprocket teeth.

3. The panoramic projector assembly described in claim 1 and in which the gate is curved to substantially the same cylindrical contour as said stationary cylindrical supporting means.

4. The panoramic projector assembly described in claim 3, and in which there is a light source for the projector located substantially in line with the axis of rotation of the lens mount, and the assembly includes a reflector located below the light source in position to deflect the light beam horizontally, a second reflector in position to direct the light beam from the first reflector downwardly behind the gate to said light supply element which comprises a third reflector located in the downwardly reflected beam and at an angle to reflect the downwardly extending beam through the film and gate in line with the optical axis of a lens of the projector assembly, all of the reflectors being carried on supports connected with the lens mount and being rotatable as a unit with the lens mount.

5. The panoramic projector assembly described in claim 1 and in which the fixed supporting means has its longitudinal axis extending downwardly from a primary support located above the projector assembly, bearings on the lower end of the fixed support and on which the lens mount and its connected parts rotate, a drive shaft extending downwardly through the fixed support and connected with the lens mount for rotating the lens mount, two jack shafts extending from the rollers, a stationary gear connected to the lower portion of the fixed supporting means, and a pinion gear at the upper end of each jack shaft in position to mesh with the stationary gear and roll around the stationary gear for imparting relative rotation to the jack shafts as the lens mount rotates.

6. The panoramic projector assembly described in claim 1 and in which there is a screen having its axis of curvatures substantially co-incident with the axis of rotation of the lens mount, a light source located above the projector assembly at a fixed location, reflectors in positions to direct the light beam from said source horizontally away from the axis of rotation, then downwardly to the level of the lens mount, and then forwardly through the film and lens mount to the screen, all of the reflectors being rotatable as a unit with the lens mount.

References Cited in the file of this patent

UNITED STATES PATENTS

| | | |
|---|---|---|
| 1,299,792 | Serrurier | Apr. 8, 1919 |
| 1,313,564 | Todd | Aug. 19, 1919 |
| 1,489,510 | Stromberg | Apr. 8, 1924 |
| 1,514,138 | Dahl | Nov. 4, 1924 |
| 1,879,600 | Burchett | Sept. 27, 1932 |
| 2,068,410 | Hanke et al. | Jan. 19, 1937 |
| 2,438,137 | Waller et al. | Mar. 23, 1948 |
| 2,596,746 | Waller | May 13, 1952 |

FOREIGN PATENTS

| | | |
|---|---|---|
| 129,646 | Germany | Apr. 16, 1902 |
| 327,058 | France | Mar. 13, 1903 |
| 327,090 | France | Mar. 14, 1903 |
| 458,586 | France | Aug. 11, 1913 |